(12) United States Patent
Blanche et al.

(10) Patent No.: US 12,345,885 B1
(45) Date of Patent: Jul. 1, 2025

(54) OPTICAL LENS SET AND IMAGE COMBINER

(71) Applicant: Amazon Technologies, Inc., Seattle, WA (US)

(72) Inventors: Pierre-Alexandre Blanche, Tucson, AZ (US); Chen Liang, Tucson, AZ (US); Angeles Marcia Almanza-Workman, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 18/127,904

(22) Filed: Mar. 29, 2023

(51) Int. Cl.
| | | |
|---|---|---|
| *G09G 5/00* | (2006.01) | |
| *G02B 3/00* | (2006.01) | |
| *G02B 27/01* | (2006.01) | |
| *G02B 27/18* | (2006.01) | |
| *G09G 3/00* | (2006.01) | |

(52) U.S. Cl.
CPC ......... *G02B 27/017* (2013.01); *G02B 3/0075* (2013.01); *G02B 27/18* (2013.01); *G09G 3/003* (2013.01); *G02B 2027/0178* (2013.01); *G02B 2027/0194* (2013.01)

(58) Field of Classification Search
CPC ..... G02B 27/017; G02B 3/0075; G02B 27/18
USPC .............................................................. 345/7
See application file for complete search history.

(56) References Cited

U.S. PATENT DOCUMENTS

| | | | |
|---|---|---|---|
| 10,509,228 B1 * | 12/2019 | Sulai ................. | G02B 27/0172 |
| 2016/0225192 A1 * | 8/2016 | Jones ..................... | G06T 19/20 |
| 2018/0196265 A1 * | 7/2018 | Bouchier ............... | G02B 5/045 |
| 2019/0056593 A1 | 2/2019 | Bablumyan | |
| 2020/0225498 A1 | 7/2020 | Potnis et al. | |
| 2022/0019080 A1 * | 1/2022 | Schultz ................... | G02B 6/00 |
| 2022/0099977 A1 * | 3/2022 | Meitav ................. | G02B 6/0031 |

\* cited by examiner

*Primary Examiner* — Jonathan M Blancha
(74) *Attorney, Agent, or Firm* — Kilpatrick Townsend & Stockton LLP

(57) ABSTRACT

Techniques for an optical lens set and optical combiner are described herein. In an example, an apparatus has a first side and a second side. The apparatus includes an optical combiner and a first optical lens disposed at the first side. The image combiner is configured to output light emitted by a light projector as a virtual image projection within a field of view. At least a first portion of the first optical lens is within the field of view and is characterized by a first optical power that provides a first optical correction. The first optical power compensates for a second optical power of a second optical lens optionally disposable at the second side.

20 Claims, 13 Drawing Sheets

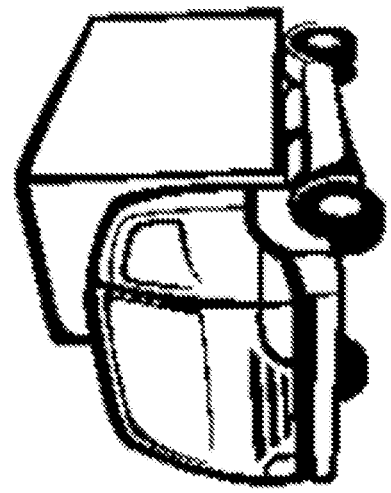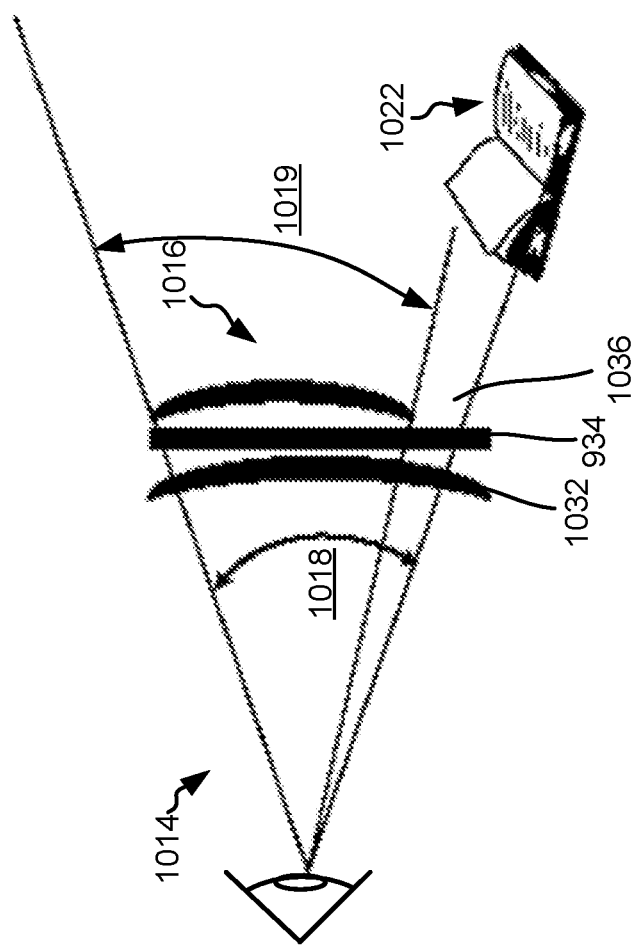
FIG. 10

OPTICAL LENS SET AND IMAGE COMBINER

BACKGROUND

Image displays, including near-eye displays, have been utilized in different mixed reality systems including, for instance, augmented reality systems and heads-up display systems. In a mixed reality system, an image can be displayed to a user from a light projector onto a light transparent display that allows the user to also view the real world.

BRIEF DESCRIPTION OF THE DRAWINGS

Various embodiments in accordance with the present disclosure will be described with reference to the drawings, in which:

FIG. 10 illustrates another example of virtual image projection using an optical lens set and an optical combiner in accordance with an embodiment of the present disclosure;

DETAILED DESCRIPTION

Figure 1:
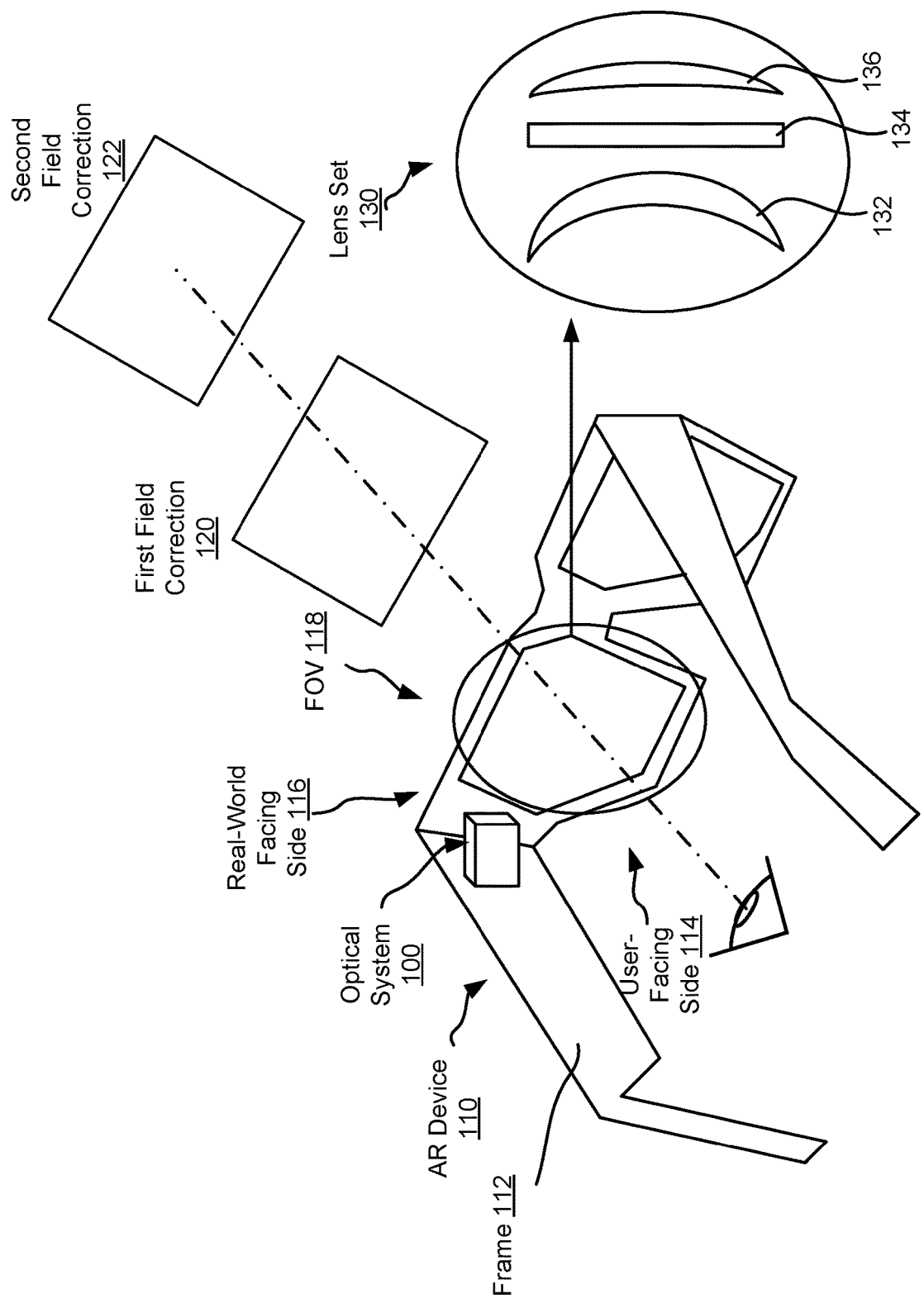
FIG. 1 illustrates an example of a mixed reality device that implements an optical lens set and image combiner in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an optical system that supports an optical lens set and an image combiner. In an example, the optical lens set includes a first optical lens and a second optical lens. The image combiner can be disposed between such optical lenses. Whereas the first optical lens provides a first field correction (e.g., a far field correction), the second optical lens provides a second field correction (e.g., a near field correction) that accounts for the first field correction. In particular, the optical power of the second optical lens can be a function of the targeted second field correction and the optical power of the first optical lens.

As such, the optical lens set may provide multi-focal vision correction, which includes bifocal, tri-focal, and progressive corrections. Multi-focal lenses differ from single vision lens such that the optical power is not constant across the entire lens. One portion of the lens can be characterized by an optical power to correct the distance vision and another portion or other portions of the lens can be characterized by optical power(s) to correct the near vision. In mixed reality devices, such as augmented reality devices, an optical combiner combines a virtual image with the see-through image (the view of the real world). The virtual image can be projected at a far distance, or the virtual image can be projected at a finite distance from the viewer. Both the virtual image and the see-through image can be in focus for the viewer based on the optical powers of the optical lenses and the disposition of the image combiner in between.

In an example, the first optical lens of the optical lens set is disposed at a real-world facing side of the optical system and can be referred to herein as an outer optical lens. The second optical lens is disposed at a user-facing side of the optical system and can be referred to herein as an inner optical lens. The image combiner can combine light received through the first optical lens (e.g., real-world light) and from a light projector (e.g., light that represents a virtual image to be projected within a user field of view (referred to herein as a field of view) such that the virtual image is visible to a user of the optical system). At least a portion of the first optical lens can be within the field of view and is characterized by an optical power that provides an optical correction (e.g., near field correction or far field correction). The optical power of the first optical lens can compensate for an optical power of the second optical lens.

To illustrate, consider an example of an augmented reality device that implements an optical system of the present disclosure. The augmented reality device can be glasses with a frame having a user-facing side and a real-world facing side (which may be referred to herein as first side, second side, or more generally sides). An inner optical lens can be attached to the frame at the user-facing side, and an outer optical lens can be attached to the frame at the real-world facing side. An optical combiner can be disposed between the inner optical lens and the outer optical lens. The outer optical lens corrects only the real image, while the inner optical lens corrects both the real image and the virtual image. To project the virtual image in the far field, the outer optical lens corrects the near field, and the inner optical lens corrects the far field. The optical power of the outer optical lens can compensate for the optical power of the inner optical lens to provide the near field correction. The inner optical lens and the outer optical lens may both fill a full aperture of the glasses. Alternatively, the inner optical lens may fill the full aperture of the glasses, while the outer optical lens fills only a portion of the aperture. For instance, for the near field correction, the outer optical lens may only be positioned in a lower portion of the user field of view.

This field of view can span a portion (or even the entirety) of the aperture defined by the frame of the glasses. If the outer optical lens fills the full aperture, a portion (e.g., upper portion) of the outer optical lens may be characterized by a zero optical power.

Embodiments of the present disclosure provide many technical advantages over conventional optical systems. In conventional optical systems, inserts may be provided with augmented reality glasses to provide optical prescriptions. The inserts sit between the eye of the viewer and a combiner of the augmented reality device. Because the light from the real world as well as from the virtual image pass through the insert, they are both optically corrected. This approach works well for single vision correction. However, the same approach does not work well for multi-focal vision correction since multi-focal inserts also correct or focus the virtual image, which is projected only at one fixed distance (e.g., far or near). When the field of view of the virtual image is large enough to intercept multiple optical prescriptions, only a part of the virtual image is corrected for the viewer, when the other part is out of focus and cannot be comfortably used to project useful information. In contrast, the optical lens set and optical combiner of the present disclosure do not impact the field of the virtual image, and that the placement of the multi-focal segment can be optimized for the comfort of the viewer without consideration for the combiner field of view or eyebox placement.

FIG. 1 illustrates an example of a mixed reality device that implements an optical lens set and image combiner in accordance with an embodiment of the disclosure. In the example of FIG. 1, the mixed reality device is illustrated as an augmented reality device 110. However, other types of mixed reality devices are likewise possible, such as heads up devices, holographic devices, and the like. Generally, a mixed reality device enables combining images from different sources via an optical waveguide combiner. One source can be the real world, whereby these images are real-world images. Another source can be a virtual world, whereby these images are virtual (or digital) images.

In the illustration of FIG. 1, the augmented reality device 110 includes an optical system 100, which can include, among other things, circuitry for projecting virtual images (e.g., including a controller, a processor, a memory, a light projector, and the like). Although illustrated as a separate component, the optical system 100 can also include a lens set 130 of the augmented reality device 110. The lens set 130 can be see-through such that real world light can be received through the lens set 130 and perceived, as real-world imagery, via the augmented reality device 110. The virtual images can be formed based on light emission from the light projector of the optical system 100.

The lens set 130 includes a number of optical lenses and an image combiner, where this number can be one, two, or more. In an example, lens set 130 includes an inner optical lens 132, an optical combiner 134, and an outer optical lens 136. The inner optical lens 132 is attached to a frame 112 of the augmented reality device 110 at a user-facing side 114 of the frame 112. The outer optical lens 136 is attached to the frame 112 at a real-world facing side 116 of the frame 112. The optical combiner 134 is disposed between the inner optical lens 132 and the outer optical lens 136. In this example, the lens set 130 is disposed in an aperture of the frame 112 such that the inner optical lens 132 is disposed in the aperture and attached to the user-facing side 114, the outer optical lens 136 is disposed in the aperture and attached to the real-world facing side 116, and the optical waveguide 134 is disposed in the aperture between the inner optical lens 132 and the outer optical lens 136. In another example, the lens set 130 can include the outer optical lens 136 and the optical combiner 134, but not the inner optical lens 132. Instead, the inner optical lens 132 can be part of another optical system that may not be a component of the augmented reality device 110. For instance, the inner optical lens 132 can be a component of user prescription eyeglasses.

The optical combiner 134 can output light emitted by the light projector of the optical system 100 as virtual images at a particular distance and within a field of view 118. The field of view 118 may be visible to a user through the aperture and, in particular, with a portion of the aperture where the portion corresponds to (e.g., contains or is spatially aligned to) at least a portion of the inner optical lens 132 and/or a portion of the outer optical lens 136. The projector-emitted light can also be combined by the optical combiner 134 with real-world light. Whereas one of the optical lenses 132 or 136 provides for a first field correction 120 (e.g., a near field correction), the other optical lens 132 or 136 (as applicable) provides for a second field correction 122 (e.g., far field correction). In this way, a user can perceive the virtual images and the real-world imagery within the field of view 118 with a reduced or even eliminated blurriness at the different distances (e.g., near and far field distances). As further described herein below, at least a first portion of the outer optical lens 136 is within the field of view 118 and is characterized by a first optical power that provides the first optical correction 120 (e.g., a near field correction or a far field correction). The first optical power of the outer optical lens 136 can compensate for a second optical power of the inner optical lens 132, which may provide the second optical correction 122.

Figure 2:
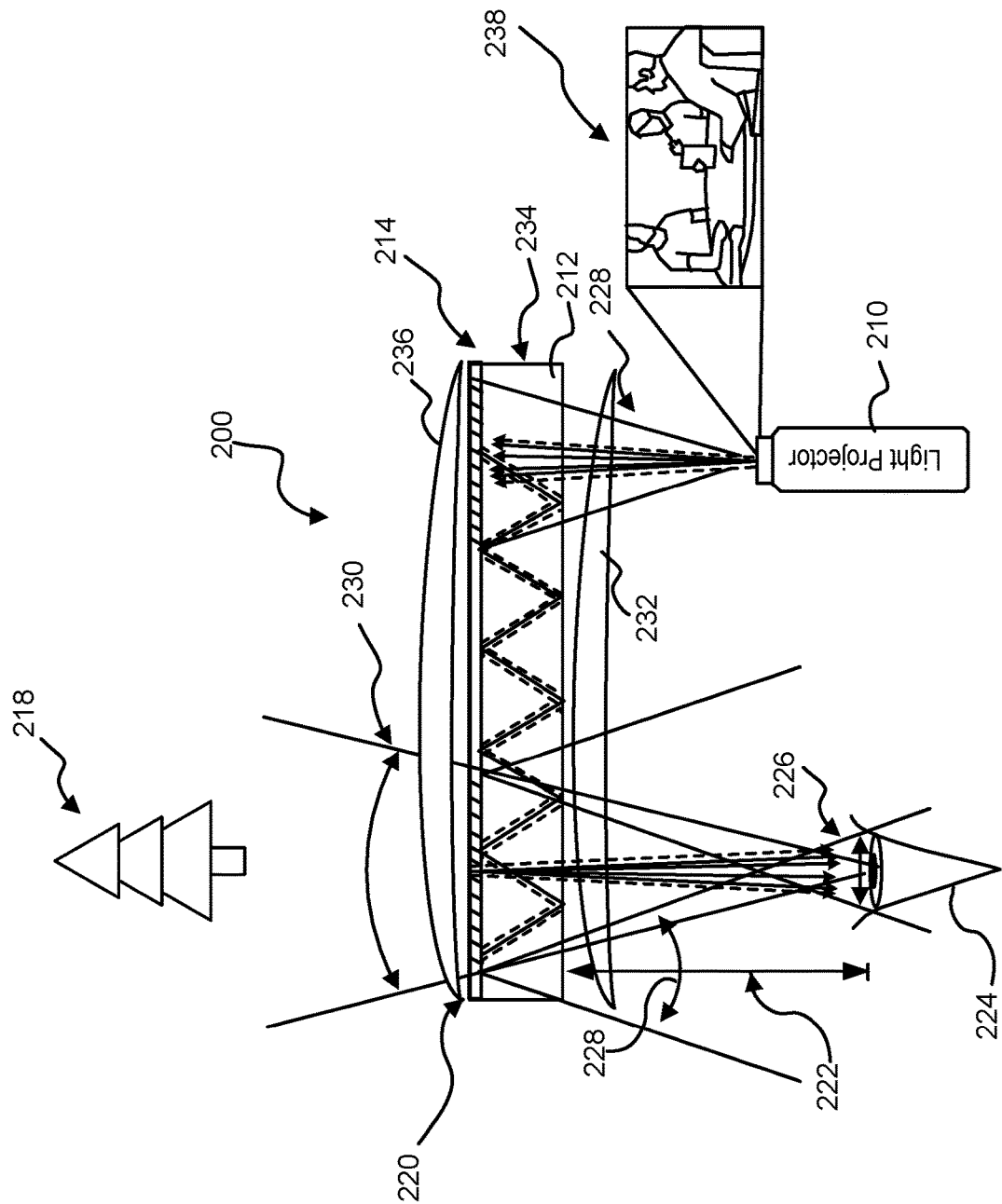
FIG. 2 illustrates a schematic of a system of an optical lens set and image combiner in accordance with an embodiment of the present disclosure.

FIG. 2 illustrates a schematic of a system of an optical lens set and image combiner in accordance with an embodiment of the present disclosure. An optical system 200 can be used in mixed reality display, such as a heads-up display or an augmented reality display and can be an example of the optical system 100 of FIG. 1. The optical system 200 includes an optical combiner 234 disposed between an inner optical lens 232 and an outer optical lens 236. Pupil replication decouples the pupil size from the field of view, which are otherwise inversely linked in other types of mixed reality systems. This advantage means that the optical combiner based displays can offer a large eyebox together with a large image field of view. In an example, the optical combiner 234 may be a waveguide optical combiner. Nonetheless, other optical combiner types are possible, such as a holographic optical element-based combiner, or any other suitable optical combiner, in other examples.

Pupil replication in the optical combiner 234 can be obtained when the image that is propagating inside the optical combiner 234 is only partially extracted (or redirected) the optical combiner 234. When this happens, the remainder of the light keeps propagating in its original direction inside the optical combiner 234. The remaining light bounces on the outer surface of the optical combiner 234 and then interacts again with the holographic optical element, where another portion is extracted (or redirected). Successive extractions of the light replicate the pupil multiple times.

The optical combiner 234 can be built using waveguide holography. This technique uses an in-coupling holographic optical element 214 to trap auxiliary content 238 (e.g., projector-emitted light representing virtual images) inside a substrate 212 through total internal reflection (TIR). The auxiliary content 238 can be generated by a light projector 210 (e.g., a light engine configured as a light source). In the substrate 212, the auxiliary content 238 propagates away from the light projector 210 and is outcoupled toward a viewer's eye 224 by an out-coupling holographic optical element 220. A holographic optical element represents a functional diffractive structure that transforms the waveform of the input beam into an output beam. A volume holographic element (VHOE) is a type of holographic optical element that operates in the Bragg diffraction regime. The optical combiner 234 represents the optical elements in the optical path from the exit aperture of the light projector 210 to the plane where light enters the viewer's eye 224. Both the in-coupling holographic optical element 214 and the out-coupling holographic optical element 220 are transparent across the entire visible range except for a percent reduction (depending on different parameters such as the type materials used, thickness, etc.) in transmission across the bandwidth of the broadband red-green-blue (RGB) light sources. This allows the viewer to see real imagery 218 and the auxiliary content 238. The light projector 210 and the out-coupling holographic optical element 220 emit within a cone of light 228.

Although FIG. 2 illustrate the in-coupling holographic optical element 214 and the out-coupling holographic optical element 220 to be on a same side of the substrate 212, embodiments of the present disclosure are not limited as such. For instance, the in-coupling holographic optical element 214 and the out-coupling holographic optical element 220 to be on opposite sides of the substrate 212. Generally, the in-coupling holographic optical element 214 is coupled to an input surface of the substrate 212 by, for instance, being mounted to and attached to the input surface. Likewise, the out-coupling holographic optical element 220 is coupled to an output surface of the substrate 212 by, for instance, being mounted to and attached to the output surface. The input surface corresponds to a surface where light from the light projector 210 is received. The output surface corresponds to a surface from which light is emitted from the substrate 212.

The optical combiner 234 can form the eyebox 226 in the horizontal and vertical directions. The eyebox 226 can correspond to the vertical and horizontal distance where the viewer's pupil receives all the angles emitted by the light projector 210. As the viewer's pupil moves outside the eyebox 226, the image becomes degraded. Eye relief 222 is the distance between the substrate surface and the entrance pupil of the viewer's eye 224. For maximum comfort, this distance should be larger than a minimum threshold distance. The field-of-view 230 is the angular size of the image determined by the geometric relationship between the size of the out-coupling holographic optical element 220 and the distance between the pupil and the surface of the out-coupling holographic optical element 220.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of in-coupling into substrate modes (light propagating through total internal reflection).

A properly designed optical combiner 234 can have a high transmission (e.g., at least 80%) of the light from the real imagery 218, a large auxiliary field of view diagonally, vertically and horizontally, a large eye box, and an ability to accept the auxiliary content 238 from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical combiner 234 maintains the white balance of the light projector 210 along the optical path to the viewer's eye 224.

While either transmission or reflection holographic optical element can be implemented in the display to produce a large field of view, reflection holographic optical elements can provide a large horizontal field of view. Transmission holographic optical elements can be used in the optical combiner 234 when the angular requirements on the field of views are smaller. Both horizontal and vertical field of views can be limited by the distance from the aperture stop of the light projector 210 to the center of the out-coupling holographic optical element 220. In order for NTE glasses to accommodate size, weight, and power restrictions, the size of the light projector 210 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical combiner 234. This is because the light forming the image experiences multiple bounces in the direction of the out-coupling holographic optical element 220 and multiple light extractions can expand the eyebox 226. In particular, a portion of the light can be extracted and output by each of the diffraction gratings of the out-coupling holographic optical element 220.

The inner optical lens 232 may be attached to a frame (e.g., frame 112 in FIG. 1) at a user-facing side of the frame. The outer optical lens 236 may be attached to the frame at a real-world facing side of the frame. The optical combiner 234 is disposed between the inner optical lens 232 and the outer optical lens 236. The optical combiner 234 can output light emitted by the light projector 210 of the optical system 200 as a virtual image projection (e.g., near field projection or far field projection) within the field of view 230. As further described herein below, at least a first portion of the outer optical lens 236 is within the field of view 230 and is characterized by a first optical power that provides a first optical correction (e.g., a near field correction or a far field correction). The first optical power of the outer optical lens 236 can compensate for a second optical power of the inner optical lens 232, which may provide a second optical correction that is the opposite of the first optical correction.

Different types of attachments are possible. The same attachment type can, but need not, be used for both the inner optical lens 232 and the outer optical lens 236. One example attachment is mechanical such as a fit connection in recesses of the frame, glue, screws, clip connections, and the like. Another example attachment is magnetic based, such as magnets attached to an optical lens interfacing with opposite magnets in the frame.

The arrangement of components of the optical system 200 is provided for illustrative purposes. Different possible of such components are possible. For example, the eyebox 226 can be centered, positioned near center, or positioned at a particular distance from the center of the inner optical lens 232, the optical waveguide 234, and/or the outer optical lens 236. Further, the light projector 210 can be positioned such that light emitted therefrom does not propagate through the inner optical lens 232. For instance, the light beam may not overlap, partially or fully, with the inner optical lens 232 and, instead, may be outside of inner optical lens 232.

Figure 3:
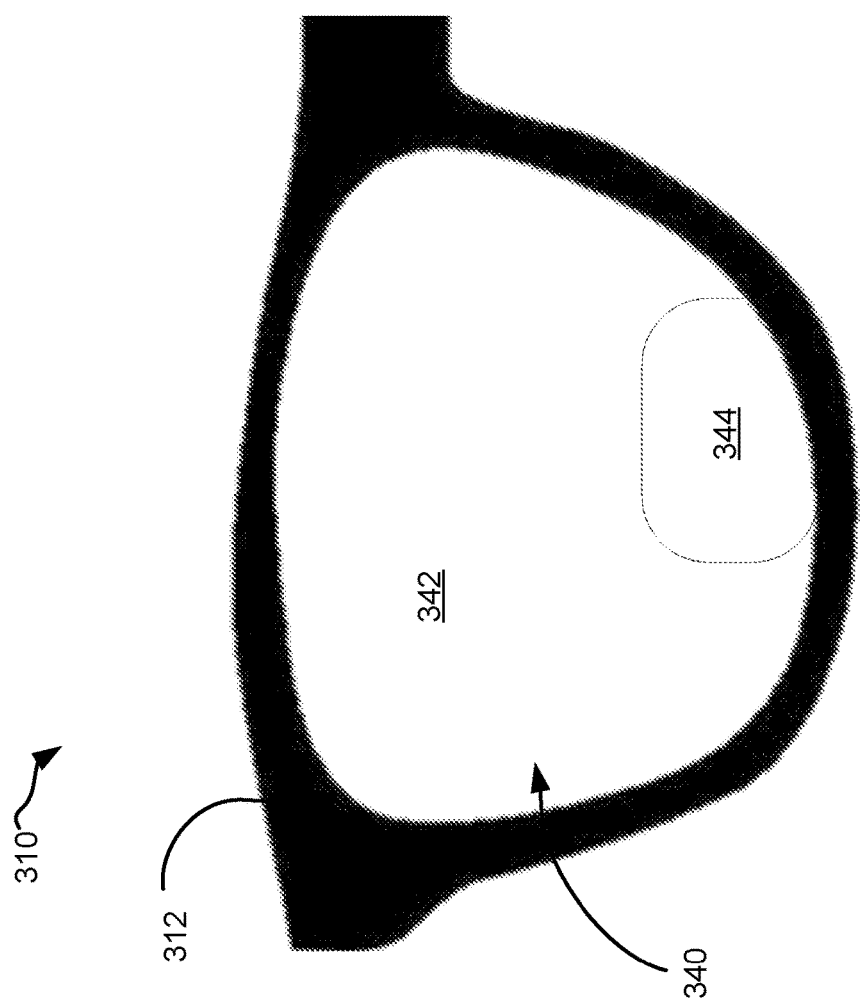
FIG. 3 illustrates an example of an augmented reality device with a bifocal lens.

FIG. 3 illustrates an example of an augmented reality device with a bifocal lens. The augmented reality device 310 is illustrated as augmented reality glasses that have a frame 312 and a lens 340. The lens 340 includes multiple optical powers so that a user can see objects at all distances even if the user is not able to naturally change the focus of their eyes (e.g., due to presbyopia).

Multi-focal vision correction includes bifocal correction, tri-focal correction, and progressive correction. A multi-focal lens differs from a single vision lens such that the optical power is not constant across the entire lens. One portion of the lens, (typically the upper portion) has an optical power to correct the distance vision and other portion or portions of the lens (typically the middle or the lower portions) has optical powers to correct the near vision (e.g., computer viewing distance or reading distance).

In a near to eye augmented reality display, a combiner combines a virtual image with the see-through image (the view of the real world). The virtual image can be projected at far away (e.g., at infinity) or it can be projected at a finite distance from the viewer (e.g., at a few meters to a few centimeters away). Both the virtual image and the see-through image need to be in focus for the viewer.

To accommodate the different optical prescriptions needed by a population of users, augmented reality glasses can be offered with inserts that sit in between the viewer eyes and the optical combiner. Because the light from the real world as well as from the virtual image are passing through the insert, they are both optically corrected. This approach may work well for single vision correction. However, the same approach does not work well for multi-focal vision correction.

Bifocal, trifocal, or progressive inserts that allow the viewer to have different optical prescriptions for both the far field (e.g., 20 ft and beyond) and the near field (e.g., reading distance) in the same lens are sometimes prescribed. However, this type of insert also corrects or focuses the virtual image, which is projected only at one fixed distance (far or near). When the field of view of the virtual image is large enough to intercept both optical prescriptions, only a part of the virtual image is corrected for the viewer, when the other part is out of focus and cannot be comfortably used to project useful information.

In an example, the lens 340 is a bifocal lens that includes two optical powers. In other examples, the lens 340 may be a trifocal lens that includes three optical powers, or another multi-focal lens with multiple optical powers. A progressive multi-focal lens can gradually change in optical power from the top half of the lens 340 to the bottom, and thus may include many optical powers.

The lens 340 includes a first portion 342 that provides an optical power for distance vision. A second portion 344 of the lens 340 provides an optical power for near field vision correction. The second portion 344 is illustrated as being in a lower corner of the lens 340. contains the power required to correct your near vision. Exemplary shapes of the second portion 344 include a flat-top shape (as shown in FIG. 3), a round segment, a narrow rectangular shape, or a full bottom half of the lens 340. Generally, the user looks up and through the first portion 342 of the lens 340 when focusing on points farther away, and the user looks down and through the second portion 344 of the lens 340 when focusing on objects close to (e.g., within 18 inches) of their eyes.

Figure 4:
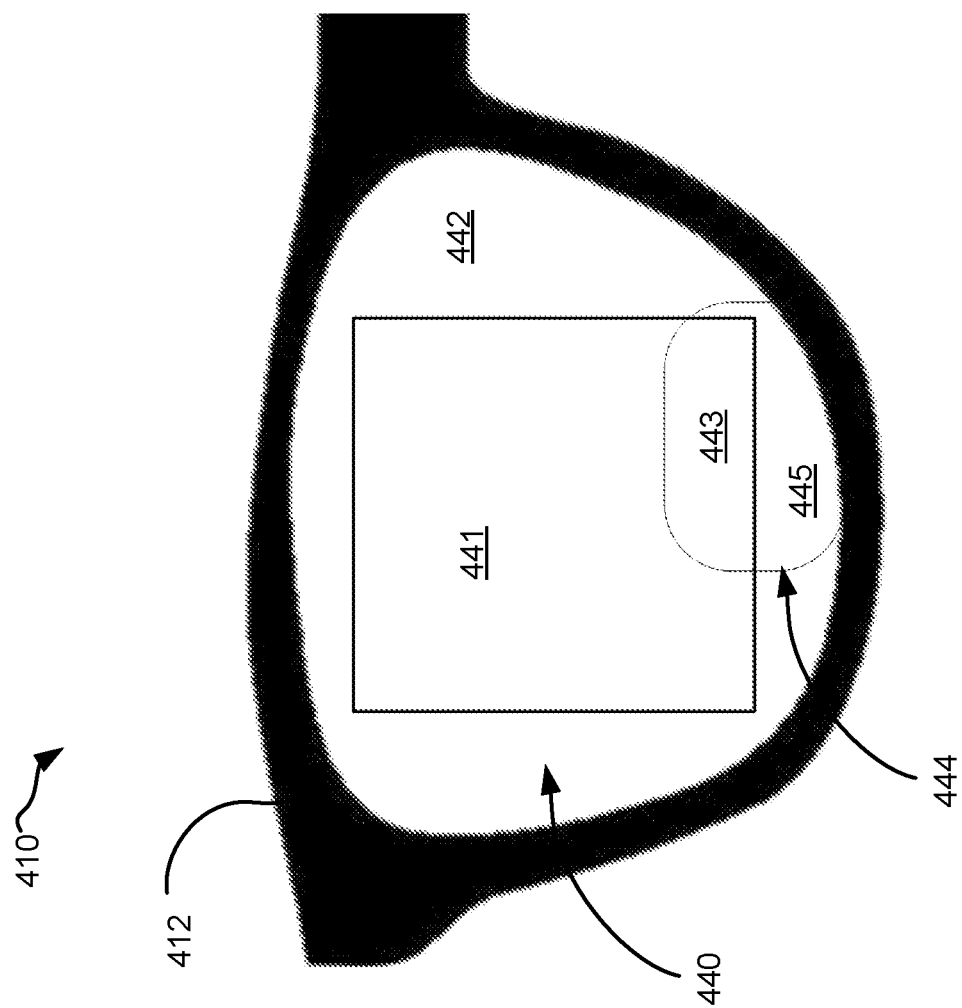
FIG. 4 illustrates an example of virtual image projection by an augmented reality device with a bifocal lens.

FIG. 4 illustrates an example of virtual image projection by an augmented reality device with a bifocal lens. The augmented reality device 410 is illustrated as augmented reality glasses that have a frame 412 and a lens 440. The lens 440 includes multiple optical powers so that a user can see objects at all distances even if the user is not able to naturally change the focus of their eyes (e.g., due to presbyopia).

In an example, the lens 440 is a bifocal lens that includes two optical powers. In other examples, the lens 440 may be a trifocal lens that includes three optical powers, or another multi-focal lens with multiple optical powers. A progressive multi-focal lens can gradually change in optical power from the top half of the lens 440 to the bottom, and thus may include many optical powers.

The lens 440 includes a first portion 442 that provides an optical power for distance vision. A second portion 444 of the lens 440 provides an optical power for near field vision correction. The second portion 444 is illustrated as being in a lower corner of the lens 440. contains the power required to correct your near vision. Exemplary shapes of the second portion 444 include a flat-top shape (as shown in FIG. 4), a round segment, a narrow rectangular shape, or a full bottom half of the lens 440. Generally, the user looks up and through the first portion 442 of the lens 440 when focusing on points farther away, and the user looks down and through the second portion 444 of the lens 440 when focusing on objects close to (e.g., within 18 inches) of their eyes.

In the case where the virtual image is projected in the far field, only the extent of the field of view intercepting with the far correction of the bifocal lens appears sharp to the viewer. The extent of the virtual image that intersects with the near correction of the insert appears blurry. That is, area 441 of the first portion 442 of the lens 440 may appear sharp to the viewer, while area 443 of the second portion 444 of the lens 440 may appear blurry to the viewer.

Alternatively, in the case where the virtual image is projected in the near field, only the extent of the field of view intercepting with the near correction of the bifocal lens appears sharp to the viewer. The extend of the virtual image field of view that intersects with the far correction of the insert appears blurry. That is, area 445 of the second portion 444 of the lens 440 may appear sharp to the viewer, while area 443 of the second portion 444 of the lens 440 may appear blurry to the viewer.

Both cases may present a problem for the comfortable use of augmented reality glasses. Even if the field of view of the virtual image is small enough and does not itinually overlap with both the optical prescriptions of a bifocal lens, the placement of the insert can vary from person to person to accommodate for different facial profiles and preferences. This requires that each device is personalized to each user's pupil location, which increases integration complexity as well as limits the location of the field of view.

Figure 5:
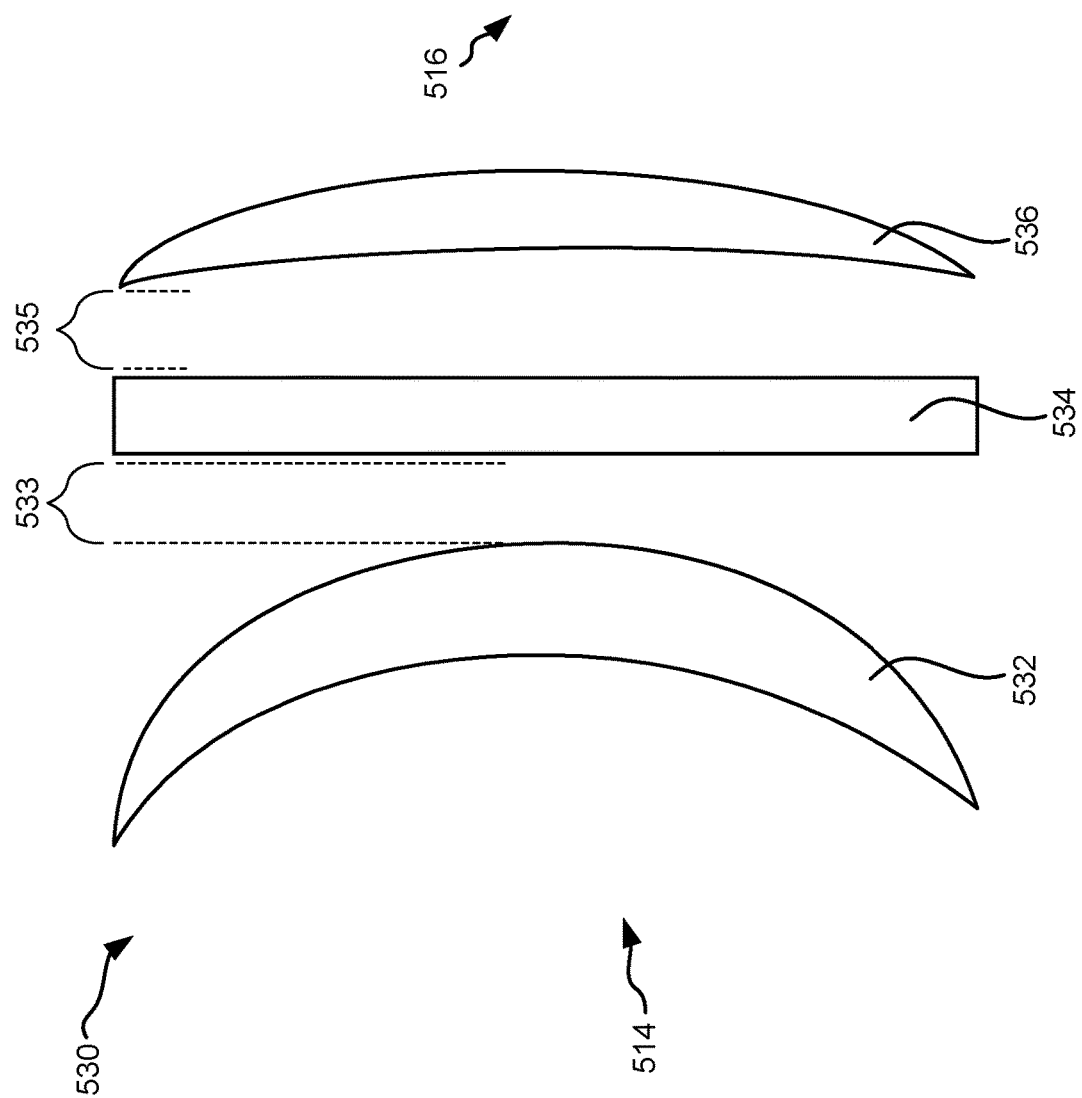
FIG. 5 illustrates an example of an optical lens set and an optical combiner in accordance with an embodiment of the present disclosure.

FIG. 5 illustrates an example of an optical lens set 530 and optical combiner 534 in accordance with an embodiment of the present disclosure. The optical lens set 530 can include an inner optical lens 532 (optionally) and an outer optical lens 536 and can allow a viewer that requires a bifocal optical prescription to see a corrected virtual image in its entire field of view. The optical lens set 530 can also include the optical combiner 534 that may be independent from the optical prescription. The outer optical lens 536 can be placed in front of the optical combiner 534 to correct only the real-world imagery. The inner optical lens 532 can be placed between the optical combiner 534 and the viewer's eyes to correct both the real-world imagery and the virtual imagery.

In an example, the optical lens set 530 is a component of an augmented reality device (e.g., augmented reality device 110 in FIG. 1) or, more broadly, of a mixed reality device and may include the inner optical lens 532 and the outer optical lens 536, in addition to the optical combiner 534. The inner optical lens 532 can be disposed at a user-facing side 514 of a frame of the augmented reality or mixed reality device and the outer optical lens 536 can be disposed at a real-world facing side 516 of the frame. The inner optical lens 532 and the outer optical lens 536 may be releasably attachable to the frame, such as via magnets, clip-on mechanisms, etc. That is, the inner optical lens 532 can be releasably attached to the frame at the user-facing side 514 and the outer optical lens 536 can be releasably attached to the frame at the real-world facing side 516.

In an example, the optical combiner 534 outputs light as a virtual image projection within a field of view. At least a first portion of the outer optical lens 536 can be within the field of view and at least a second portion of the inner optical lens 532 can be within the field of view. The outer optical lens 536 can be characterized by a first optical power that provides a first optical correction (e.g., near field correction or far field correction). The inner optical lens 532 can be characterized by a second optical power that provides a second optical correction. The outer optical lens 536 can compensate for the second optical power.

In the case where the virtual image is projected in the far field, the first optical power of the outer optical lens 536 disposed in front of the optical combiner 534 can provide near field correction. The second optical power of the inner optical lens 532 disposed between the optical combiner 534 and the viewer's eye can provide far field correction. The inner optical lens 532 that corrects for the far field vision can cover the entire virtual image field of view, including the overlap with near field section. Because the inner optical lens 532 extends over the outer optical lens 536, the outer optical lens 536 can include the combined optical power of both the inner optical lens 532 and the near field correction to compensate for the second optical power of the inner optical lens 532.

Correction of the inner optical lens 532 and the outer optical lens 536 can be reversed if the virtual image is projected in the near field. For instance, the first optical power of the outer optical lens 536 disposed in front of the optical combiner 534 can provide the far field correction and the second optical power of the inner optical lens 532 disposed between the optical combiner 534 and the viewer's eye can provide the near field correction. In that case, the inner optical lens 532 can cover the entire virtual image field of view, and first optical power of the outer optical lens 536 can compensate for the correction of the inner optical lens 532 in addition to providing the correction for the far field.

The augmented reality device may change a value of one or more of the optical powers such that the virtual image is projected at a target distance. For example, to project the virtual image at various distances, different values may be used for the first optical power and/or the second optical power. Upon determining the target distance for the virtual image projection, the augmented reality device can tune the second optical power of the inner optical lens 532 to the value that corresponds to the target distance and/or can tune the first optical power of the outer optical lens 536 to compensate for the second optical power. The inner optical lens 532 can focus the image from the optical combiner 534 at the target distance of the virtual image, and the outer optical lens 536 can compensate the second optical power to offer an un-aberrated view of the outside world.

As illustrated in FIG. 5, there may be a first gap 533 between the inner optical lens 532 and the optical combiner 534 and a second gap 535 between the optical combiner 534 and the outer optical lens 536. The inner optical lens 532 and the outer optical lens 536 can be releasably attached to the frame, while the optical combiner 534 may be fixedly attached to the frame. For instance, the optical combiner 534 may be disposed in an encapsulation material such as glass or plastic. In particular, the encapsulation material can be processed (e.g., by using laser beams) to define the optical combiner 534 therein. Alternatively, a visibly transparent material (e.g., visible transparent resin or epoxy) can be placed to surround the optical combiner 534 and cured (e.g., temperature curing, ultra-violet curing, etc.) to harden and form the encapsulation material. The sizes of the first and second gaps 533 and 535 may, but need not, be the same. These two gaps 533 and 535 may, but need not, be of the same type such as by being air gaps.

While the outer optical lens 536 is illustrated in FIG. 5 as covering a same portion of the field of view as the inner optical lens 532, in other examples the outer optical lens 536 may cover less of the field of view as the inner optical lens 532. For instance, the outer optical lens 536 may only cover a lower portion of the field of view for near field image projections or the outer optical lens 536 may only cover an upper portion of the field of view for far field projections. If the outer optical lens 536 covers the field of view, different portions of the outer optical lens 536 may be characterized by different optical powers. For example, for near field correction, the lower portion of the outer optical lens 536 may be characterized by the first optical power, while the upper portion of the outer optical lens 536 is characterized by a zero optical power. Alternatively, for far field correction, the upper portion of the outer optical lens 536 may be characterized by the first optical power, while the lower portion of the outer optical lens 536 is characterized by a zero optical power.

Figure 6:
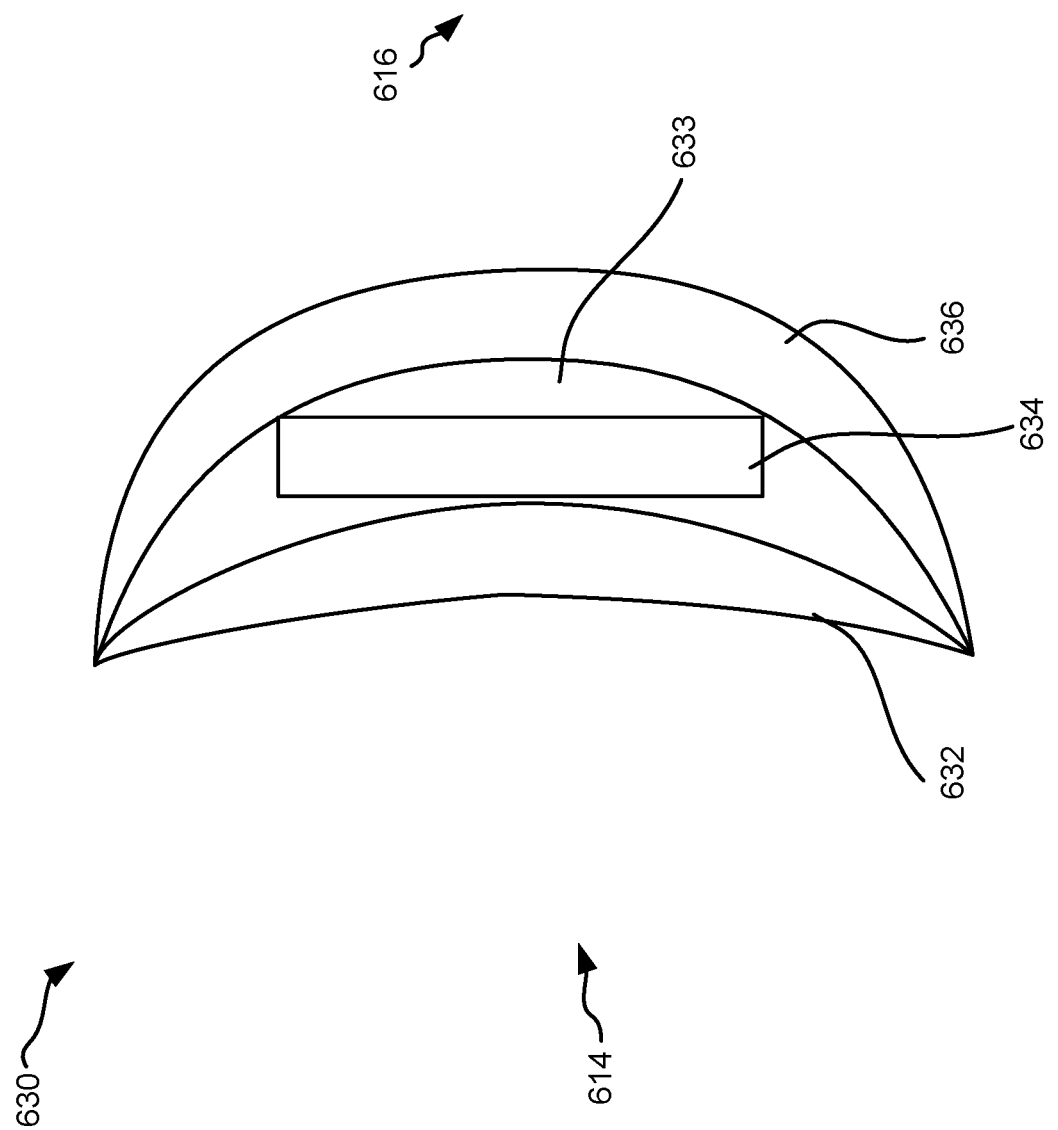
FIG. 6 illustrates another example of an optical lens set and an optical combiner in accordance with an embodiment of the present disclosure.

FIG. 6 illustrates another example of an optical lens set 630 and optical combiner 634 in accordance with an embodiment of the present disclosure. The optical lens set 630 includes an inner optical lens 632 and an outer optical lens 636 and can allow a viewer that requires a bifocal optical prescription to see a corrected virtual image in its entire field of view. The optical lens set 630 can also include the optical combiner 634 that may be independent from the optical prescription. The outer optical lens 636 can be placed in front of the optical combiner 634 to correct only the real image. The inner optical lens 632 can be placed between the optical combiner 634 and the viewer's eyes to correct both the real image and the virtual. Unlike the optical lens set 530 of FIG. 5, the inner optical lens 632 and the outer optical lens 636 can be formed as a single component or can be attached together to form a gap 633 (e.g., an inner volume) where the optical combiner 634 can be disposed.

In an example, the inner optical lens 632 can be disposed on a user-facing side 614 of a frame of an augmented reality device or, more broadly, a mixed reality device and the outer optical lens 636 can be disposed on a real-world facing side 616 of the frame. The inner optical lens 632 and the outer optical lens 636 may be releasably attachable to the frame, such as via magnets, clip-on mechanisms, etc. That is, the inner optical lens 632 can be releasably attached to the frame at the user-facing side 614 and the outer optical lens 636 can be releasably attached to the frame at the real-world facing side 616.

In an example, the optical combiner 634 outputs light as a virtual image projection within a field of view. At least a first portion of the outer optical lens 636 can be within the field of view and at least a second portion of the inner optical lens 632 can be within the field of view. The outer optical lens 636 can be characterized by a first optical power that provides a first optical correction (e.g., near field correction or far field correction). The inner optical lens 632 can be characterized by a second optical power that provides a second optical correction. The outer optical lens 636 can compensate for the second optical power.

In the case where the virtual image is projected in the far field, the first optical power of the outer optical lens 636 disposed in front of the optical combiner 634 can provide near field correction. The second optical power of the inner optical lens 632 disposed between the optical combiner 634 and the viewer's eye can provide far field correction. The inner optical lens 632 that corrects for the far field vision can cover the entire virtual image field of view, including the overlap with near field section. Because the inner optical lens 632 extends over the outer optical lens 636, the outer optical lens 636 can include the combined optical power of both the inner optical lens 632 and the near field correction to compensate for the second optical power of the inner optical lens 632.

Correction of the inner optical lens 632 and the outer optical lens 636 can be reversed if the virtual image is projected in the near field. For instance, the first optical power of the outer optical lens 636 disposed in front of the optical combiner 634 can provide the far field correction and the second optical power of the inner optical lens 632 disposed between the optical combiner 634 and the viewer's eye can provide the near field correction. In that case, the inner optical lens 632 can cover the entire virtual image field of view, and first optical power of the outer optical lens 636 can compensate for the correction of the inner optical lens 632 in addition to providing the correction for the far field.

The augmented reality device may change a value of an optical power such that the virtual image is projected at a target distance. To project the virtual image at various distances, different optical power values may be used. For example, upon determining the target distance for the virtual image projection, the augmented reality device can tune the second optical power of the inner optical lens 632 to the value that corresponds to the target distance. The inner optical lens 632 can focus the image from the optical combiner 634 at the target distance, and the outer optical lens 636 can compensate the second optical power to offer an un-aberrated view of the outside world.

As illustrated in FIG. 6, the inner optical lens 632 is coupled to the outer optical lens 636 (e.g., the inner optical lens 632 and the outer optical lens 636 are adjacent to each other and at edges of these two lenses 632 and 636 are attached mechanically to each other), and the gap 633 is defined between the inner optical lens 632 and the outer optical lens 636. The gap 633 is an interior volume between the inner optical lens 632 and the outer optical lens 636. The optical combiner 634 is disposed in the gap 633. The gap 633 may, but need not, be an air gap and its dimensions and geometric properties can depend on the desired power corrections (e.g., related to the optical lens curvatures), the size of the field of view, and/or the dimensions of the optical combiner 634.

While the outer optical lens 636 is illustrated in FIG. 6 as covering a same portion of the field of view as the inner optical lens 632, in other examples the outer optical lens 636 may cover less of the field of view as the inner optical lens 632. For instance, the outer optical lens 636 may only cover a lower portion of the field of view for near field image projections or the outer optical lens 636 may only cover an upper portion of the field of view for far field projections. If the outer optical lens 636 covers the field of view, different portions of the outer optical lens 636 may be characterized by different optical powers. For example, for near field correction, the lower portion of the outer optical lens 636 may be characterized by the first optical power, while the upper portion of the outer optical lens 636 is characterized by a zero optical power. Alternatively, for far field correction, the upper portion of the outer optical lens 636 may be characterized by the first optical power, while the lower portion of the outer optical lens 636 is characterized by a zero optical power.

Figure 7:
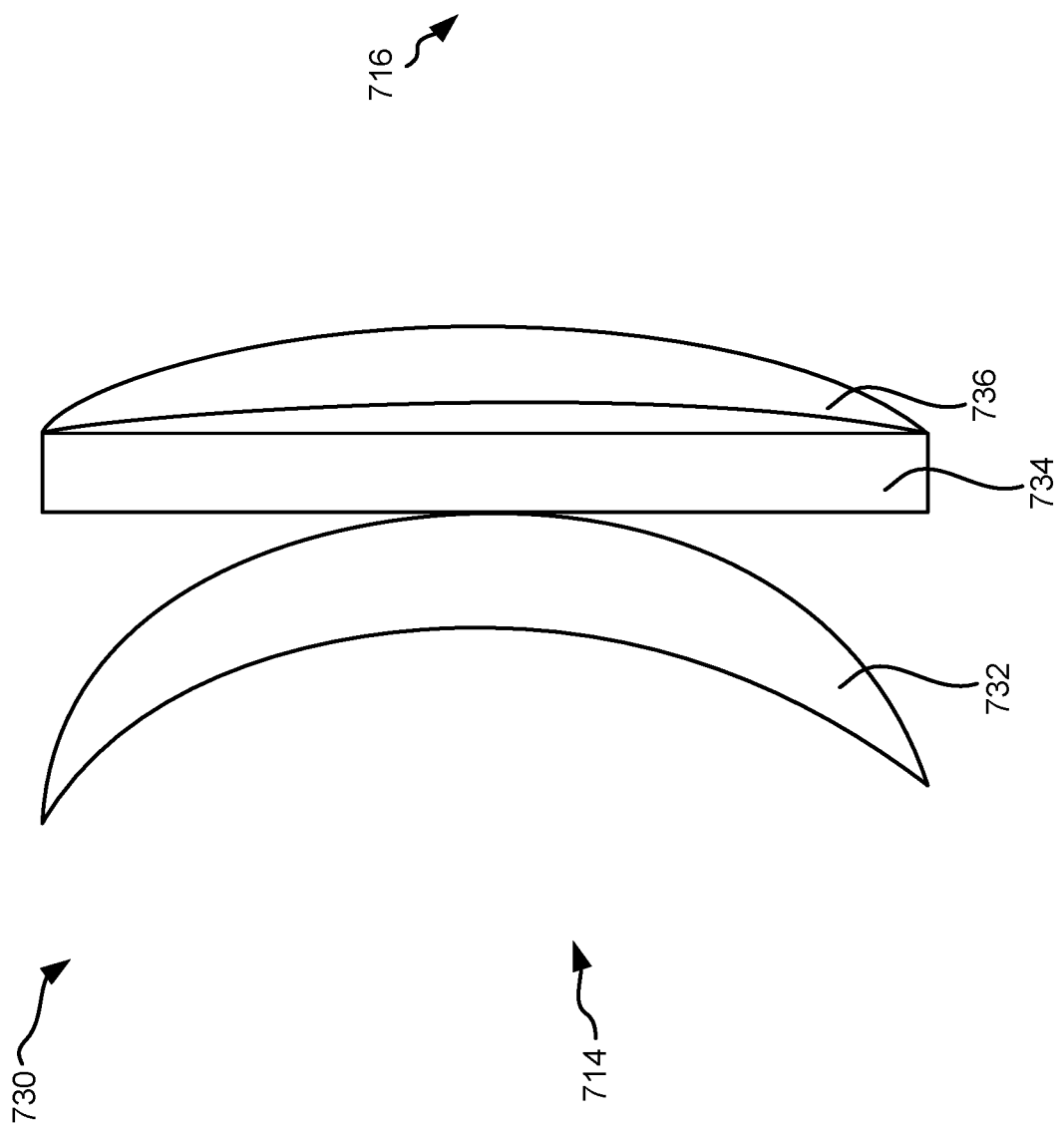
FIG. 7 illustrates another example of an optical lens set and an optical combiner in accordance with an embodiment of the present disclosure.

FIG. 7 illustrates another example of an optical lens set 730 and optical combiner 734 in accordance with an embodiment of the present disclosure. The optical lens set 730 includes an inner optical lens 732 (optionally) and an outer optical lens 736 and can allow a viewer that requires a bifocal optical prescription to see a corrected virtual image in its entire field of view. The optical lens set 730 can also include the optical combiner 734 that may be independent from the optical prescription. The outer optical lens 736 can be placed in front of the optical combiner 734 to correct only the real image. The inner optical lens 732 can be placed between the optical combiner 734 and the viewer's eyes to correct both the real image and the virtual. Unlike the optical lens set 530 of FIG. 5, at least the outer optical lens 736 can be attached to the optical combiner 734.

In an example, the inner optical lens 732 can be disposed on a user-facing side 714 of a frame of an augmented reality device or, more broadly, of a mixed reality device and the outer optical lens 736 can be disposed on a real-world facing side 716 of the frame. The inner optical lens 732 and the outer optical lens 736 may be releasably attachable to the frame, such as via magnets, clip-on mechanisms, etc. That is, the inner optical lens 732 can be releasably attached to the frame at the user-facing side 714 and the outer optical lens 736 can be releasably attached to the frame at the real-world facing side 716.

In an example, the optical combiner 734 outputs light as a virtual image projection within a field of view. At least a first portion of the outer optical lens 736 can be within the field of view and at least a second portion of the inner optical lens 732 can be within the field of view. The outer optical lens 736 can be characterized by a first optical power that provides a first optical correction (e.g., near field correction or far field correction). The inner optical lens 732 can be characterized by a second optical power that provides a second optical correction. The outer optical lens 736 can compensate for the second optical power.

In the case where the virtual image is projected in the far field, the first optical power of the outer optical lens 736 disposed in front of the optical combiner 734 can provide near field correction. The second optical power of the inner optical lens 732 disposed between the optical combiner 734 and the viewer's eye can provide far field correction. The inner optical lens 732 that corrects for the far field vision can cover the entire virtual image field of view, including the overlap with near field section. Because the inner optical lens 732 extends over the outer optical lens 736, the outer optical lens 736 can include the combined optical power of both the inner optical lens 732 and the near field correction to compensate for the second optical power of the inner optical lens 732.

Correction of the inner optical lens 732 and the outer optical lens 736 can be reversed if the virtual image is projected in the near field. For instance, the first optical power of the outer optical lens 736 disposed in front of the optical combiner 734 can provide the far field correction and the second optical power of the inner optical lens 732 disposed between the optical combiner 734 and the viewer's eye can provide the near field correction. In that case, the inner optical lens 732 can cover the entire virtual image field of view, and first optical power of the outer optical lens 736 can compensate for the correction of the inner optical lens 732 in addition to providing the correction for the far field.

The augmented reality device may change a value of an optical power such that the virtual image is projected at a target distance. To project the virtual image at various distances, different optical power values may be used. For example, upon determining the target distance for the virtual image projection, the augmented reality device can tune the second optical power of the inner optical lens 732 to the value that corresponds to the target distance. The inner optical lens 732 can focus the image from the optical combiner 734 at the target distance, and the outer optical lens 736 can compensate the second optical power to offer an un-aberrated view of the outside world.

As illustrated in FIG. 7, the optical combiner 734 can be coupled to the inner optical lens 732 and the outer optical lens 736 by being attached, on one side, the inner optical lens 732 and, on an opposite side, to the outer optical lens 736. In an example, the optical combiner 734 may be coupled to the inner optical lens 732 and the outer optical lens 736 using optical glue, or another suitable mechanism. In addition, the optical combiner 734 may be fixedly attached to the frame. For instance, the optical combiner 734 may be disposed in an encapsulation material such as user visible light transparent glass or user visible light transparent plastic.

While the outer optical lens 736 is illustrated in FIG. 7 as covering a same portion of the field of view as the inner optical lens 732, in other examples the outer optical lens 736 may cover less of the field of view as the inner optical lens 732. For instance, the outer optical lens 736 may only cover a lower portion of the field of view for near field image projections or the outer optical lens 736 may only cover an upper portion of the field of view for far field projections. If the outer optical lens 736 covers the field of view, different portions of the outer optical lens 736 may be characterized by different optical powers. For example, for near field correction, the lower portion of the outer optical lens 736 may be characterized by the first optical power, while the upper portion of the outer optical lens 736 is characterized by a zero optical power. Alternatively, for far field correction, the upper portion of the outer optical lens 736 may be characterized by the first optical power, while the lower portion of the outer optical lens 536 is characterized by a zero optical power.

Figure 8:
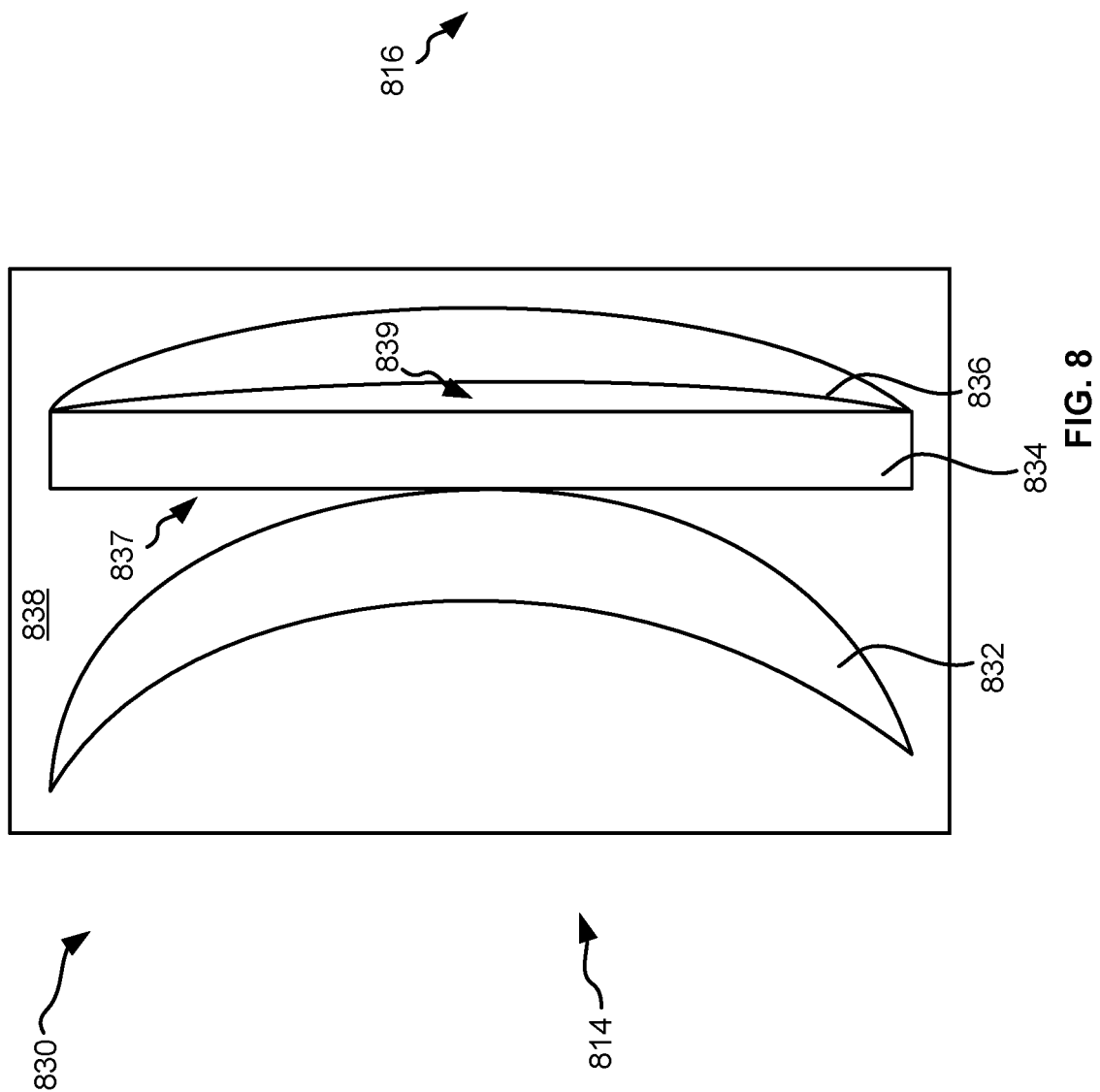
FIG. 8 illustrates another example of an optical lens set and an optical combiner in accordance with an embodiment of the present disclosure.

FIG. 8 illustrates another example of an optical lens set 830 and an optical combiner 834 in accordance with an embodiment of the present disclosure. The optical lens set 830 includes an inner optical lens 832 and an outer optical lens 836 and can allow a viewer that requires a bifocal optical prescription to see a corrected virtual image in its entire field of view. The optical lens set 830 can also include the optical combiner 834 that may be independent from the optical prescription. The outer optical lens 836 can be placed in front of the optical combiner 834 to correct only the real image. The inner optical lens 832 can be placed between the optical combiner 834 and the viewer's eyes to correct both the real image and the virtual. Unlike the optical lens set 530 of FIG. 5, the optical lens set 830 includes an encapsulation material 838 that can be optically transparent and that surrounds the inner optical lens 832, the optical combiner 834, and the outer optical lens 836. In addition to the arrangement shown in FIG. 8, in some embodiments, the encapsulation material 838 can encapsulate other/different arrangements of optical lenses and optical combiners such as the arrangements shown in FIGS. 5-7.

In an example, the inner optical lens 832 can be disposed on a user-facing side 814 of a frame of an augmented reality device or, more broadly, a mixed reality device and the outer optical lens 836 can be disposed on a real-world facing side 816 of the frame. The inner optical lens 832 and the outer optical lens 836 may be releasably attachable to the frame, such as via magnets, clip-on mechanisms, etc. That is, the inner optical lens 832 can be releasably attached to the frame at the user-facing side 814 and the outer optical lens 836 can be releasably attached to the frame at the real-world facing side 816.

In an example, the optical combiner 834 outputs light as a virtual image projection within a field of view. At least a first portion of the outer optical lens 836 can be within the field of view and at least a second portion of the inner optical lens 832 can be within the field of view. The outer optical lens 836 can be characterized by a first optical power that provides a first optical correction (e.g., near field correction or far field correction). The inner optical lens 832 can be characterized by a second optical power that provides a second optical correction. The outer optical lens 836 can compensate for the second optical power.

In the case where the virtual image is projected in the far field, the first optical power of the outer optical lens 836 disposed in front of the optical combiner 834 can provide near field correction. The second optical power of the inner optical lens 832 disposed between the optical combiner 834 and the viewer's eye can provide far field correction. The inner optical lens 832 that corrects for the far field vision can cover the entire virtual image field of view, including the overlap with near field section. Because the inner optical lens 832 extends over the outer optical lens 836, the outer optical lens 836 can include the combined optical power of both the inner optical lens 832 and the near field correction to compensate for the second optical power of the inner optical lens 832.

Correction of the inner optical lens 832 and the outer optical lens 836 can be reversed if the virtual image is projected in the near field. For instance, the first optical power of the outer optical lens 836 disposed in front of the optical combiner 834 can provide the far field correction and the second optical power of the inner optical lens 832 disposed between the optical combiner 834 and the viewer's eye can provide the near field correction. In that case, the inner optical lens 832 can cover the entire virtual image field of view, and the first optical power of the outer optical lens 836 can compensate for the correction of the inner optical lens 832 in addition to providing the correction for the far field.

The augmented reality device may change a value of an optical power such that the virtual image is projected at a target distance. To project the virtual image at various distances, different optical power values may be used. For example, upon determining the target distance for the virtual image projection, the augmented reality device can tune the second optical power of the inner optical lens 832 to the value that corresponds to the target distance. The inner optical lens 832 can focus the image from the optical combiner 834 at the target distance, and the outer optical lens 836 can compensate the second optical power to offer an un-aberrated view of the outside world.

As illustrated in FIG. 8, the optical combiner 834 can be disposed in the encapsulation material 838 (e.g., user visible light transparent glass or user visible light transparent plastic). The inner optical lens 832 and the outer optical lens 836 can be carved into the encapsulation material 838. In addition, or in the alternative, the inner optical lens 832 can be included in or attached to a first side 837 of the optical combiner 834 and the outer optical lens 836 can be included in or attached to a second side 839 of the optical combiner 834.

While the outer optical lens 836 is illustrated in FIG. 8 as covering a same portion of the field of view as the inner optical lens 832, in other examples the outer optical lens 836 may cover less of the field of view as the inner optical lens 832. For instance, the outer optical lens 836 may only cover a lower portion of the field of view for near field image projections or the outer optical lens 836 may only cover an upper portion of the field of view for far field projections. If the outer optical lens 836 covers the field of view, different portions of the outer optical lens 836 may be characterized by different optical powers. For example, for near field correction, the lower portion of the outer optical lens 836 may be characterized by the first optical power, while the upper portion of the outer optical lens 836 is characterized by a zero optical power. Alternatively, for far field correction, the upper portion of the outer optical lens 836 may be characterized by the first optical power, while the lower portion of the outer optical lens 836 is characterized by a zero optical power.

Although FIGS. 5-8 illustrate various arrangements of an inner optical lens, an outer optical lens, and an optical combiner, a combination of the arrangements may be possible. For example, the outer optical lens can be attached to or included in the optical combiner (or its encapsulation material), whereas a gap may exist between the optical combiner and the inner optical lens. In addition, the inner optical lens may be optional. In some instances, the inner optical lens can be an optical lens from a user's prescription eyeglasses.

Figure 9:
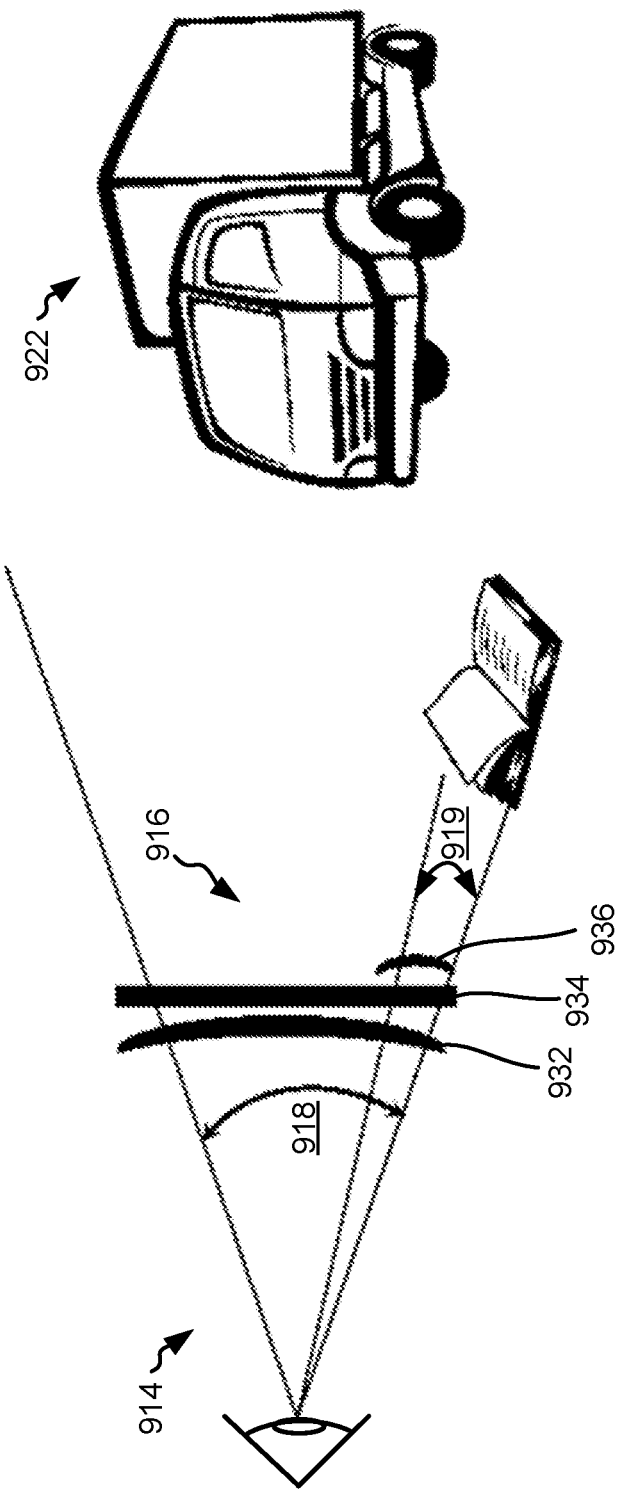
FIG. 9 illustrates an example of virtual image projection using an optical lens set and an optical combiner in accordance with an embodiment of the present disclosure.

FIG. 9 illustrates an example of virtual image projection using an optical lens set and an optical combiner in accordance with an embodiment of the present disclosure. The optical lens set can include an inner optical lens 932 and an outer optical lens 936 and can allow a viewer that requires a bifocal optical prescription to see a corrected virtual image in its entire field of view. The optical lens set can also include an optical combiner 934 that may be independent from the optical prescription. The outer optical lens 936 can be placed in front of the optical combiner 934 to correct only the real image. The inner optical lens 932 can be placed between the optical combiner 934 and the viewer's eyes to correct both the real image and the virtual image.

In an example, the inner optical lens 932 can be disposed on a user-facing side 914 of a frame of an augmented reality device or, more broadly, a mixed reality device and the outer optical lens 936 can be disposed on a real-world facing side 916 of the frame. The inner optical lens 932 and the outer optical lens 936 may be releasably attachable to the frame, such as via magnets, clip-on mechanisms, etc. That is, the inner optical lens 932 can be releasably attached to the frame at the user-facing side 914 and the outer optical lens 936 can be releasably attached to the frame at the real-world facing side 916.

In an example, the optical combiner 934 outputs light as a virtual image projection 922 within a field of view 918. At least a first portion of the outer optical lens 936 can be within the field of view 918 and at least a second portion of the inner optical lens 932 can be within the field of view 918. For example, the inner part of the outer optical lens 936 is within the field of view 918, whereas an outer part (e.g., the edge) of the outer optical lens 936 may be outside the field of vide 918. The outer optical lens 936 can be characterized by a first optical power that provides a first optical correction (e.g., near field correction or far field correction). The inner optical lens 932 can be characterized by a second optical power that provides a second optical correction (e.g., which may be opposite to the first optical correction by being a far field correction or a near field correction). The outer optical lens 936 can compensate for the second optical power.

The augmented reality device may change a value of an optical power such that the virtual image is projected at a target distance. To project the virtual image at various distances, different optical power values may be used. For example, upon determining the target distance for the virtual image projection, the augmented reality device can tune the second optical power of the inner optical lens 932 to the value that corresponds to the target distance. The inner optical lens 932 can focus the image from the optical combiner 934 at the target distance, and the outer optical lens 936 can compensate the second optical power to offer an un-aberrated view of the outside world.

As illustrated in FIG. 9, the virtual image projection 922 is projected in the far field. So, the first optical power of the outer optical lens 936 disposed in front of the optical combiner 934 can provide near field correction. This outer optical lens 936 can be disposed near a lower portion of the field of view 918 such that the near field correction can be available to a user near a bottom of the optical lens set. The second optical power of the inner optical lens 932 disposed between the optical combiner 934 and the viewer's eye can provide far field correction. The inner optical lens 932 that corrects for the far field vision can cover the entire virtual image field of view 918, including the overlap with near field section. In other words, the field of view 918 is within an area of the inner optical lens 932. Because the inner optical lens 932 extends over the outer optical lens 936, the outer optical lens 936 can include the combined optical power of both the inner optical lens 932 and the near field correction to compensate for the second optical power of the inner optical lens 932. For instance, the first optical power compensates for the second optical power by having a first value that equals a value of the near field correction minus a second value of the second optical power: $P_{out}=R_X-P_{in}$, where $P_{out}$ is the first optical power, $P_{in}$ is the second optical power, and $R_X$ is the near field correction. In an example, the outer optical lens 936 is within a portion 919 of the field of view 918, while the inner optical lens 932 spans the entire field of view 918. As illustrated, the portion 919 of the field of view 918 is a lower portion of the field of view 918.

FIG. 10 illustrates another example of virtual image projection using an optical lens set and an optical combiner in accordance with an embodiment of the present disclosure. The optical lens set can include an inner optical lens 1032 and an outer optical lens 1036 and can allow a viewer that requires a bifocal optical prescription to see a corrected virtual image in its entire field of view. The optical lens set can also include an optical combiner 1034 that may be independent from the optical prescription. The outer optical lens 1036 can be placed in front of the optical combiner 1034 to correct only the real image. The inner optical lens 1032 can be placed between the optical combiner 1034 and the viewer's eyes to correct both the real image and the virtual image.

In an example, the inner optical lens 1032 can be disposed on a user-facing side 1014 of a frame of an augmented reality device or, more broadly, a mixed reality device and the outer optical lens 1036 can be disposed on a real-world facing side 1016 of the frame. The inner optical lens 1032 and the outer optical lens 1036 may be releasably attachable to the frame, such as via magnets, clip-on mechanisms, etc. That is, the inner optical lens 1032 can be releasably attached to the frame at the user-facing side 1014 and the outer optical lens 1036 can be releasably attached to the frame at the real-world facing side 1016.

In an example, the optical combiner 1034 outputs light as a virtual image projection 1022 within a field of view 1018. At least a first portion of the outer optical lens 1036 can be within the field of view 1018 and at least a second portion of the inner optical lens 1032 can be within the field of view 1018. The outer optical lens 1036 can be characterized by a first optical power that provides a first optical correction (e.g., near field correction or far field correction). The inner optical lens 1032 can be characterized by a second optical power that provides a second optical correction. The outer optical lens 1036 can compensate for the second optical power.

The augmented reality device may change a value of an optical power such that the virtual image is projected at a target distance. To project the virtual image at various distances, different optical power values may be used. For example, upon determining the target distance for the virtual image projection, the augmented reality device can tune the second optical power of the inner optical lens 1032 to the value that corresponds to the target distance. The inner optical lens 1032 can focus the image from the optical combiner 1034 at the target distance, and the outer optical lens 1036 can compensate the second optical power to offer an un-aberrated view of the outside world.

As illustrated in FIG. 10, the virtual image projection 1022 is projected in the near field. So, the first optical power of the outer optical lens 1036 disposed in front of the optical combiner 1034 can provide far field correction. The second optical power of the inner optical lens 1032 disposed between the optical combiner 1034 and the viewer's eye can provide near field correction. The inner optical lens 1032 that corrects for the near field vision can cover the entire virtual image field of view 1018, including the overlap with far field section. In other words, the field of view 1018 is within an area of the inner optical lens 1032. Because the inner optical lens 1032 extends over the outer optical lens 1036, the outer optical lens 1036 can include the combined optical power of both the inner optical lens 1032 and the far field correction to compensate for the second optical power of the inner optical lens 1032. For instance, the first the first optical power compensates for the second optical power by having a first value that equals a value of the far field correction minus a second value of the second optical power: $P_{out} = R_X - P_{in}$, where $P_{out}$ is the first optical power, $P_{in}$ is the second optical power, and $R_X$ is the far field correction. In an example, the outer optical lens 1036 is within a portion 1019 of the field of view 1018, while the inner optical lens 1032 spans the entire field of view 1018. As illustrated, the portion 1019 of the field of view 1018 is an upper portion of the field of view 1018.

Figure 11:
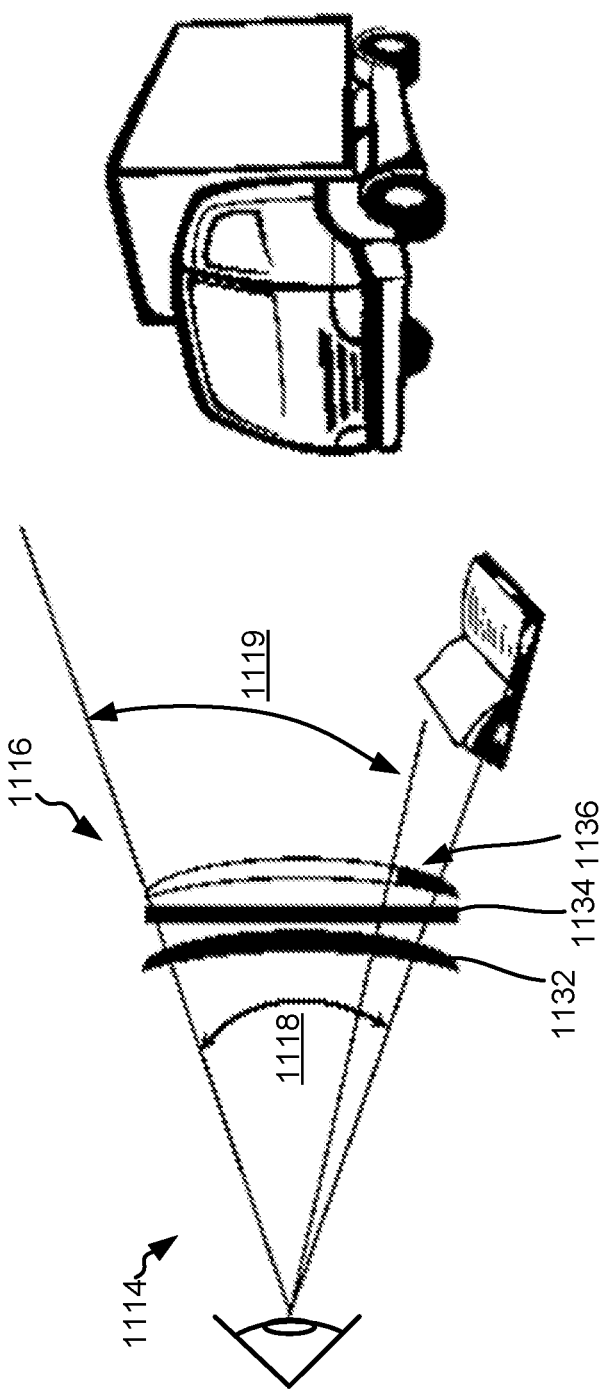
FIG. 11 illustrates another example of virtual image projection using an optical lens set and an optical combiner in accordance with an embodiment of the present disclosure.

FIG. 11 illustrates another example of virtual image projection using an optical lens set and an optical combiner in accordance with an embodiment of the present disclosure. The optical lens set can include an inner optical lens 1132 and an outer optical lens 1136 and can allow a viewer that requires a bifocal optical prescription to see a corrected virtual image in its entire field of view. The optical lens set can also include an optical combiner 1134 that may be independent from the optical prescription. The outer optical lens 1136 can be placed in front of the optical combiner 1134 to correct only the real image. The inner optical lens 1132 can be placed between the optical combiner 1134 and the viewer's eyes to correct both the real image and the virtual image.

In an example, the inner optical lens 1132 can be disposed on a user-facing side 1114 of a frame of an augmented reality device or, more broadly, a mixed reality device and the outer optical lens 1136 can be disposed on a real-world facing side 1116 of the frame. The inner optical lens 1132 and the outer optical lens 1136 may be releasably attachable to the frame, such as via magnets, clip-on mechanisms, etc. That is, the inner optical lens 1132 can be releasably attached to the frame at the user-facing side 1114 and the outer optical lens 1136 can be releasably attached to the frame at the real-world facing side 1116.

In an example, the optical combiner 1134 outputs light as a virtual image projection 1122 within a field of view 1118. At least a first portion of the outer optical lens 1136 can be within the field of view 1118 and at least a second portion of the inner optical lens 1132 can be within the field of view 1118. The outer optical lens 1136 can be characterized by a first optical power that provides a first optical correction (e.g., near field correction or far field correction). The inner optical lens 1132 can be characterized by a second optical power that provides a second optical correction. The outer optical lens 1136 can compensate for the second optical power.

The augmented reality device may change a value of an optical power such that the virtual image is projected at a target distance. To project the virtual image at various distances, different optical power values may be used. For example, upon determining the target distance for the virtual image projection, the augmented reality device can tune the second optical power of the inner optical lens 1132 to the value that corresponds to the target distance. The inner optical lens 1132 can focus the image from the optical combiner 1134 at the target distance, and the outer optical lens 1136 can compensate the second optical power to offer an un-aberrated view of the outside world.

As illustrated in FIG. 11, the inner optical lens 1132 and the outer optical lens 1136 each extend an entirety of the field of view 1118. That is, the field of view 1118 is within an area of the inner optical lens 1132 and the outer optical lens 1136. If the outer optical lens 1136 provides near field correction, the portion of the outer optical lens 1136 characterized by the first optical power can be a lower portion of the outer optical lens 1136. An upper portion of the outer optical lens 1136 may be characterized by a zero optical power, such that the upper portion does not provide near field correction or far field correction. An entirety of the inner optical lens 1132 may be characterized by the second optical power to provide far field correction.

In contrast, if the outer optical lens 1136 provides far field correction, the portion of the outer optical lens 1136 characterized by the first optical power can be an upper portion of the outer optical lens 1136. A lower portion of the outer optical lens 1136 may be characterized by a zero optical power, such that the lower portion does not provide near field correction or far field correction. An entirety of the inner optical lens 1132 may be characterized by the second optical power to provide near field correction.

In some examples, the lens set may provide tri-focal or other multi-focal corrections. For instance, there may be a portion of the outer optical lens 1136 between the portion that provides the first optical power and the portion that provides zero optical power. This intermediate portion can be characterized by a third optical power that provides an intermediate field correction. Additional portions of the outer optical lens 1136 may be characterized by other optical powers providing other field corrections.

Figure 12:
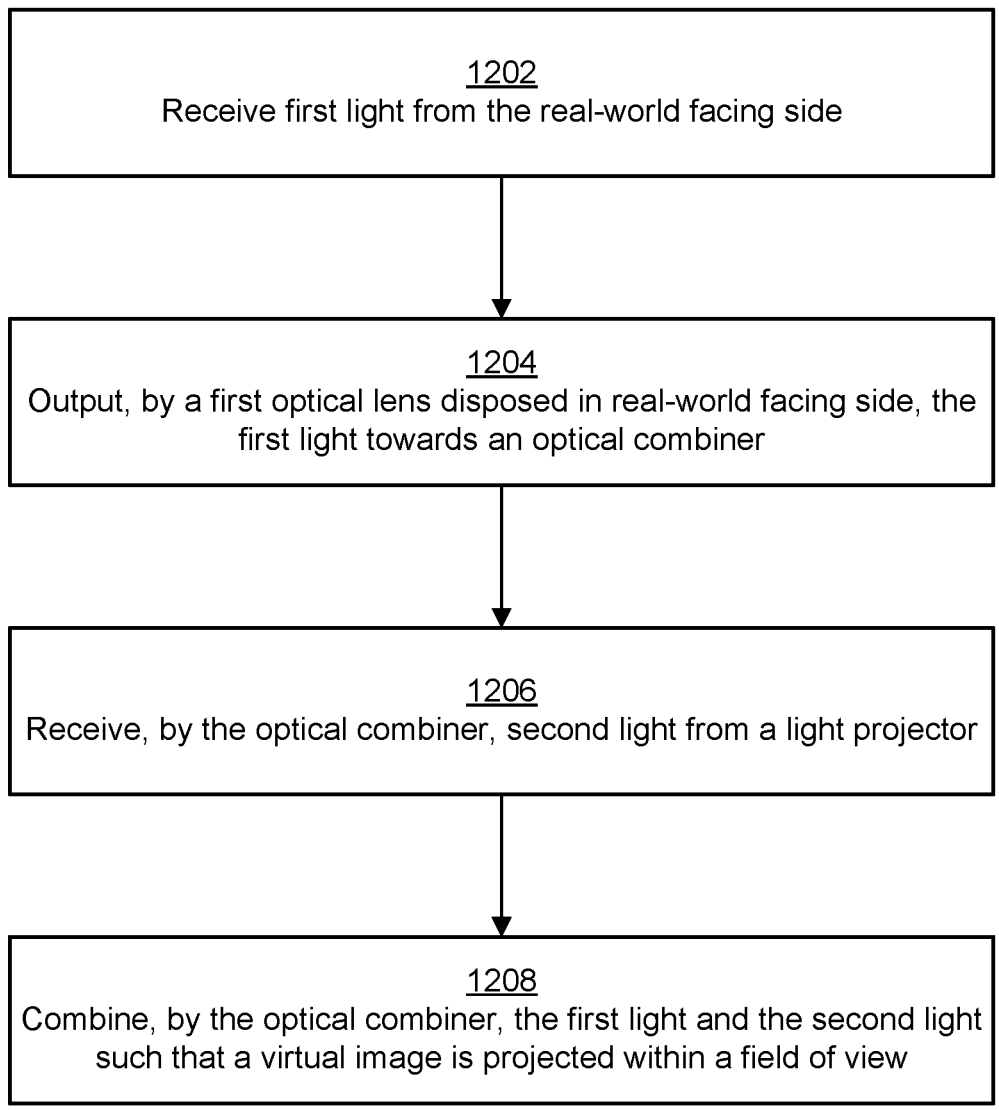
FIG. 12 illustrates an example of a flow for multi-focal correction using an augmented reality device in accordance with an embodiment of the present disclosure.

FIG. 12 illustrates an example of a flow for multi-focal correction using an augmented reality device in accordance with an embodiment of the present disclosure. An augmented reality device (e.g., augmented reality device 110 in FIG. 1) is described as performing the operations of the example flow. Nonetheless the operations can be performed by any type of mixed reality devices. Some instructions for performing the operations of the illustrative flow can be stored as computer-readable instructions on a non-transitory computer-readable medium of the augmented reality device. As stored, these instructions represent programmable modules that include code or data executable by a processor(s) of the augmented reality device. The execution of such instructions configures the augmented reality device to perform the specific operations shown in the figure and described herein. Each programmable module in combination with the processor(s) represents a means for performing a respective operation(s). While the operations are illustrated in a particular order, it should be understood that no particular order.

In an example, the flow includes operation 1202, where the augmented reality device receives first light from a real-world facing side. This first light may be real-world light that represents real-world imagery. The augmented reality device may include an apparatus (e.g., glasses frame) with a user-facing side and a real-world facing side. A first optical lens may be disposed at (e.g., attached to) the real-world facing side and a second optical lens may be disposed at (e.g., attached to) the user-facing side. The first optical lens can be an outer optical lens and the second optical lens can be an inner optical lens. The first light can be received through the first optical lens.

In an example, the flow includes operation 1204, the first optical lens disposed in the real-world facing side outputs the first light towards an optical combiner. The optical combiner can be disposed between the first optical lens and the second optical lens.

In an example, the flow includes operation 1206, where the optical combiner receives second light from a light projector. For example, the second light is emitted by the light projector and represents virtual image(s) or imagery. The emission can be directly towards the optical combiner or redirected through a set of mirrors and/or reflectors.

In an example, the flow includes operation 1208, where the optical combiner combiners the first light and the second light such that a virtual image is projected with in the field of view, while also the real-world imagery is shown within the field of view. At least a first portion of the first optical lens can be within the field of view and characterized by a first optical power that provides a first optical correction. The first optical power can compensate for a second optical power of a second optical lens. In some examples, the field of view can be within an area of the first optical lens and the second optical lens.

In an example, the virtual image may be projected in the far field. So, the first optical power of the first optical lens can provide near field correction. The second optical power of the second optical lens can provide far field correction. Because the second optical lends extends over the first optical lens, the first optical lens can include the combined optical power of both the second optical lens and the near field correction to compensate for the second optical power of the second optical lens.

In another example, the virtual image may be projected in the near field. So, the first optical power of the first optical lens can provide the far field correction and the second optical power of the second optical lens can provide the near field correction. In that case, the second optical lens can cover the entire virtual image field of view, and the first optical power of the first optical lens can compensate for the correction of the second optical lens in addition to providing the correction for the far field.

In an example, the augmented reality device may change a value of an optical power such that the virtual image is projected at a target distance. To project the virtual image at various distances, different optical power values may be used. For example, upon determining the target distance for the virtual image projection, the augmented reality device can tune the second optical power to the value that corresponds to the target distance. The second optical lens can focus the image from the optical combiner at the target distance, and the first optical lens can compensate the second optical power to offer an un-aberrated view of the outside world. The tuning of the optical power value can be performed as an operation that precedes any of the above operations. For example, an initial tuning operation can be performed prior to operation 1202, whereby the optical power value is set. This tuning can be used in conjunction with waveguide combiners that have difficulties projecting images at other distances than infinity due to chromatic aberration. The tuning may also be used with tunable lenses (e.g., fluidic or liquid crystal) that can refocus the virtual image at any distance without changing the view of the outside view.

Figure 13:
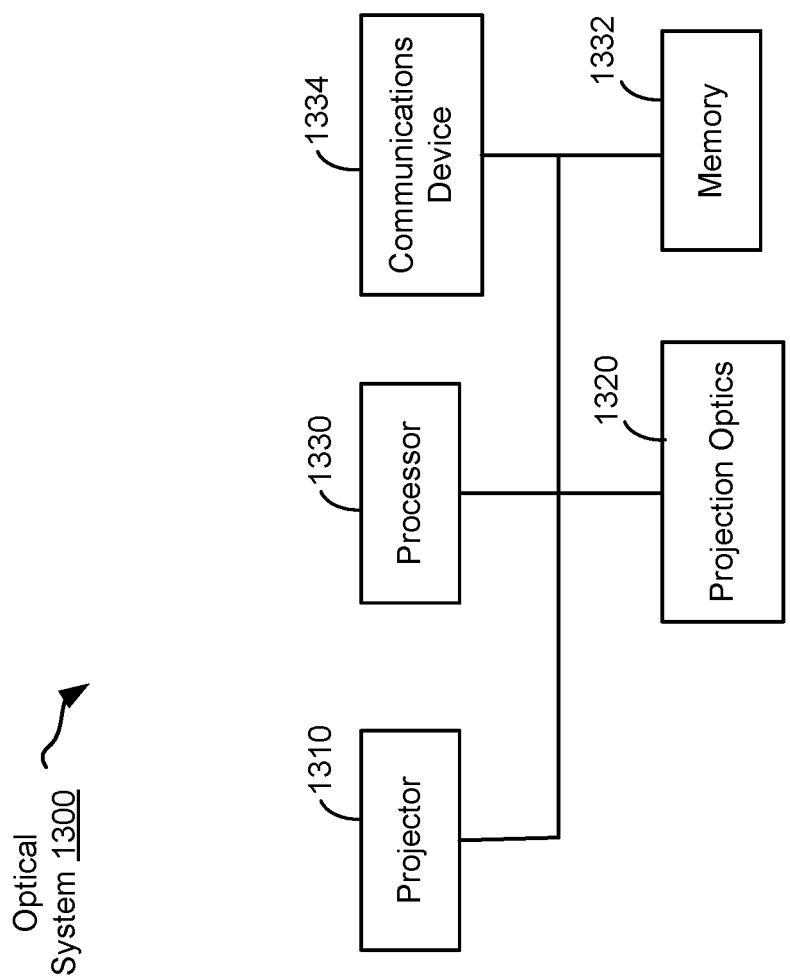
FIG. 13 illustrates a schematic diagram of an optical system in accordance with an embodiment of the present disclosure.

FIG. 13 illustrates a schematic diagram of an optical system 1300 system in accordance with an embodiment of the present disclosure. As illustrated in FIG. 13, the optical system 1300 supports a mixed reality device, such as any of the devices described herein above. In an example, the optical system 1300 includes a projector 1310, which can be implemented as discussed in relation to the light projectors discussed herein above. The optical system 1300 can also include projection optics 1320 operable to direct light produced using projector 1310. The optical system 1300 additionally includes a processor 1330 (e.g., a microprocessor), a memory 1332, and a communications device 1334. The memory 1332, also referred to as storage media or non-transitory computer readable storage media, stores computer-readable instructions of an application, where the computer-readable instructions are executable by the processor 1330 to run the application.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An augmented reality device comprising:
   a frame having a user-facing side and real-world facing side and comprising an aperture;
   a light projector configured to emit light;
   an optical combiner configured to receive the light and output a virtual image within a user field of view, wherein the virtual image is visible through a portion of the aperture;
   a first optical lens attached to the frame at the real-world facing side, wherein the first optical lens is disposed in only the portion of the aperture, and wherein the entirety of the first optical lens is characterized by a first optical power that provides a near-field correction; and
   a second optical lens attached to the frame at the user-facing side, wherein the second optical lens is disposed in and fully occupies the aperture, and wherein the entirety of the second optical lens is characterized by a second optical power that provides a far-field correction;
   wherein the optical combiner is disposed in the aperture and between the first optical lens and the second optical lens, and
   wherein the first optical power has a first value that equals a value of the near-field correction minus a second value of the second optical power.

2. The augmented reality device of claim 1, wherein the aperture includes a first aperture and a second aperture, wherein the virtual image is visible through the first aperture only.

3. The augmented reality device of claim 2, wherein the first optical lens is disposed in the first aperture, and wherein a portion of the second optical lens is disposed in the second aperture.

4. The augmented reality device of claim 1, wherein a value of the first optical power is set such that the virtual image is projected at a target distance.

5. An apparatus having a first side and a second side, the apparatus comprising:
   an optical combiner configured to output light emitted by a light projector as a virtual image within a field of view that is viewable via an aperture; and
   a first optical lens disposed at the first side and occupies only a portion of the aperture, wherein the virtual image is viewable through at least a first portion of the first optical lens and the entirety of the first optical lens is characterized by a first optical power that is based at least in part on a first optical correction and a second optical power of a second optical lens, wherein the second optical lens is disposed in and fully occupies the aperture, and wherein the entirety of the second optical lens is characterized by the second optical power.

6. The apparatus of claim 5 further comprising the second optical lens, wherein the optical combiner is disposed between the first optical lens and the second optical lens.

7. The apparatus of claim 6, wherein the first optical correction is a near-field correction, and wherein the second optical power provides a far-field correction.

8. The apparatus of claim 6, wherein the first optical correction is a far-field correction, and wherein the second optical power provides a near-field correction.

9. The apparatus of claim 5, wherein the aperture includes a first aperture portion, wherein the virtual image is visible through the first aperture portion, and wherein the first optical lens is disposed in the first aperture portion.

10. The apparatus of claim 9, wherein the aperture includes a second aperture portion, wherein a first portion of the second optical lens is disposed in the first aperture portion and a second portion of the second optical lens is disposed in the second portion, and wherein the virtual image is visible only through the first aperture portion.

11. The apparatus of claim 5, wherein the aperture includes a first aperture portion and a second aperture portion, wherein the virtual image is visible through only the first aperture portion, wherein the entirety of the first optical lens is disposed in the first aperture portion.

12. The apparatus of claim 5, further comprising a frame that includes the aperture, and wherein the optical combiner is disposed in the aperture.

13. The apparatus of claim 12, wherein the optical combiner occupies only a portion of the aperture.

14. The apparatus of claim 12, wherein the entirety of the optical combiner is disposed in the aperture.

15. The apparatus of claim 5, wherein the first optical power has a first value that equals a value of the first optical correction minus a second value of the second optical power.

16. An apparatus having a first side and a second side, the apparatus comprising:
   a frame that includes an aperture;
   an optical combiner configured to receive light from a light projector and output a virtual image within a field of view;
   a first optical lens disposed at the first side, wherein the virtual image is viewable via at least a first portion of the first optical lens and the first portion of the first optical lens is characterized by a first optical power that provides a first optical correction, the first optical correction being one of a near-field correction or a far-field correction; and
   a second optical lens disposed at the second side, wherein at least a first portion of the second optical lens is characterized by a second optical power that provides a second optical correction, the second optical correction being a remaining one of the near-field correction or the far-field correction, wherein the first optical power compensates for the second optical power,
   wherein:
      the first optical lens is disposed in and occupies only a portion of the aperture,
      the entirety of the first optical lens is characterized by the first optical power, the second optical lens is disposed in and fully occupies the aperture, and the entirety of the second optical lens is characterized by the second optical power.

17. The apparatus of claim 16, wherein the first optical lens is attached to the frame at the first side, and wherein the second optical lens is attached to the frame at the second side, wherein the optical combiner is disposed between the first optical lens and the second optical lens.

18. The apparatus of claim 16, wherein a value of the first optical power is set such that the virtual image is projected at a target distance.

19. The apparatus of claim 16, wherein the optical combiner is disposed between the first optical lens and the second optical lens.

20. The apparatus of claim 19, wherein a gap separates the optical combiner and at least one of the first optical lens or the second optical lens.

\* \* \* \* \*